United States Patent [19]
Gonzalez

[11] Patent Number: 5,436,813
[45] Date of Patent: Jul. 25, 1995

[54] ILLUMINATION APPARATUS AND METHOD OF USING AND MAKING SAME

[75] Inventor: Jaime D. Gonzalez, Downey, Calif.

[73] Assignee: U.S. Neon Corporation, Huntington Park, Calif.

[21] Appl. No.: 108,886

[22] Filed: Aug. 18, 1993

Related U.S. Application Data

[63] Continuation-in-part of Ser. No. 5,643, Jan. 19, 1993, which is a continuation-in-part of Ser. No. 839,814, Feb. 21, 1992, Pat. No. 5,192,125, which is a continuation of Ser. No. 741,784, Aug. 6, 1991, Pat. No. 5,150,961.

[51] Int. Cl.$^6$ .............................................. F21S 3/00
[52] U.S. Cl. ................... 362/216; 362/219; 362/221; 362/263
[58] Field of Search .............. 362/216, 217, 219, 226, 362/260, 263, 265, 221

[56] References Cited

U.S. PATENT DOCUMENTS

| | | | |
|---|---|---|---|
| 1,903,433 | 4/1933 | Beck et al. | 362/216 |
| 2,304,594 | 12/1942 | Pennybacke | 362/216 |
| 2,472,597 | 6/1949 | Levy | 362/216 |
| 4,363,083 | 12/1982 | Tawaka et al. | 362/216 |
| 4,549,251 | 10/1985 | Chatman et al. | 362/216 |
| 4,740,873 | 4/1988 | Blake | 362/216 |
| 4,751,434 | 6/1988 | Helling et al. | 362/216 |
| 5,113,328 | 5/1992 | Foster et al. | 362/260 |
| 5,142,466 | 8/1992 | Foster et al. | 362/260 |
| 5,226,724 | 7/1993 | Kanarek | 362/226 |
| 5,337,225 | 8/1994 | Brookman | 362/226 |

Primary Examiner—Richard R. Cole
Attorney, Agent, or Firm—Bernard L. Kleinke; Jerry R. Potts

[57] ABSTRACT

A new and improved illumination apparatus and method of making and using it for illuminating large and small areas, such as the exterior and interior of a motor vehicle, building structure or the like. The apparatus includes an elongated neon tube for radiating bright glowing light both radially and axially, an elongated tube holder for holding the neon tube stationary relative to a mounting surface, an energy conversion device adapted to be coupled to a source of low voltage power for electrically energizing the neon tube, and a mounting arrangement to secure the energy conversion device within the tube holder without blocking the bright glowing light radiating axially from the neon tube. The preferred method of using the apparatus is mounting the apparatus to a surface in close proximity to an area to be illuminated and coupling the apparatus to a source of low voltage direct current electrical power. The preferred method of making the apparatus is mounting an elongated neon tube having a pair of spaced apart U-shaped end portions within a tube holder, mounting an energy conversion device in a space between the corresponding distal ends of the end portions and coupling the energy conversion device between the neon tube and electrical conductor means to facilitate coupling the energy conversion device to a source of low voltage direct current electrical power.

19 Claims, 3 Drawing Sheets

5,436,813

ILLUMINATION APPARATUS AND METHOD OF USING AND MAKING SAME

CROSS-REFERENCE TO RELATED APPLICATIONS

This application is a continuation-in-part patent application of U.S. patent application Ser. No. 08/005,643 entitled "NEON ILLUMINATION APPARATUS AND METHOD OF USING SAME," filed Jan. 19, 1993 and is related to U.S. patent application Ser. No. 08/005,583 entitled "APPARATUS FOR ILLUMINATING A VEHICLE LICENSE PLATE AND METHOD OF USING SAME," filed on Jan. 19, 1993, now U.S. Pat. No. 5,255,166, which applications are both continuation-in-part applications of U.S. patent application Ser. No. 07/839,814 filed Feb. 21, 1992, now U.S. Pat. No. 5,192,125, which is a continuation of U.S. patent application Ser. No. 07/741,784 filed Aug. 6, 1991 now U.S. Pat. No. 5,150,961, which applications and patents have at least one common inventor and are incorporated herein by reference.

TECHNICAL FIELD

This invention relates in general to an illumination apparatus and method of using and making it, and more particularly it relates to a neon illumination apparatus for illuminating small and large areas with a bright glowing light.

BACKGROUND ART

Apparatus for illuminating small and large areas with neon light is well known. Although such lighting techniques are well known, illuminating small and large areas with such neon illuminating devices has not been entirely satisfactory. Additionally, neon illuminating devices have not always been entirely efficient in its production of light. In this regard, due to the construction of the housing for the tube and any electrical components for energizing it, the illumination produced by the neon tube required bulky housings and components, which sometimes made the advantages of neon lighting be far outweighed by the disadvantages. In this regard, when it may be desirable to have neon lighting in a certain area, the bulk of the components and protective housings could preclude the use of such lighting for some applications. For example, where space is limited, neon lighting may not be an option, considering the required high voltage components and protective housings required for neon lighting.

Therefore, it would be highly desirable to have a new and improved neon lighting system which is compact in size, and readily usable. In this manner, the advantages of brightness of light and long lasting dependability can be realized more extensively.

Furthermore, when relatively large areas require illumination, such as outdoor decorative lighting for buildings, long expensive neon tubes must be employed. Such long tubes are not only expensive, but they are also very fragile and tend to break easily when inadvertently jarred or impacted. Moreover, such long tubes are difficult to transport and store. Thus, installation of such neon illumination apparatus and associated tubes has been relatively expensive and time consuming, requiring the use of special transportation equipment, frames and cushioning materials.

Another problem with both short and long neon tubes is associated with energization. In this regard, in order to ionize the neon gas disposed within such tubes, high voltage must be utilized. Such high voltage is not only potentially dangerous, but also is not readily available except by the use of large, bulky and expensive step-up transformers.

Therefore, it would be highly desirable to have such a new and improved neon illumination apparatus and method of making and using it for illuminating either a small or a large area with bright glowing light in a compact manner. Such an apparatus should be easy to transport, without having to employ undesired and unwanted high voltage energization.

DISCLOSURE OF INVENTION

It is the principal object of the present invention to provide a new and improved neon illumination apparatus and method of using and making it for illuminating both small and large areas with bright glowing light in a more compact and efficient manner.

It is a further object of the present invention to provide such a new and improved neon illumination apparatus which is self contained and which can be installed easily and quickly by relatively unskilled and untrained personnel.

Briefly, the above and further objects of the present invention are realized by providing a new and improved illumination apparatus and method of making and using it for illuminating large and small areas, such as the exterior and interior of a motor vehicle, building structure or the like. The illumination apparatus includes an elongated neon tube having reversely bent end portions for radiating bright glowing light both radially and axially over substantially the entire axial length of the neon tube, and an elongated tube holder for holding the neon tube stationary relative to a mounting surface. An energy conversion device adapted to be coupled to a source of low voltage power for energizing electrically the neon tube, is mounting entirely within the tube holder without blocking the bright glowing light radiating axially and radially outwardly from the neon tube.

The preferred method of using the apparatus is mounting the apparatus to a surface in close proximity to an area to be illuminated and coupling the apparatus between a source of low voltage direct current electrical power and such additional like apparatus to fully illuminate the area to be illuminated.

The preferred method of making the apparatus is mounting an elongated neon tube having a pair of spaced apart U-shaped end portions within a tube holder, mounting an energy conversion device in a space adjacent to a tube holder mounting surface, and coupling the energy conversion device between the neon tube and electrical conductor means to facilitate coupling the energy conversion device to a source of low voltage direct current electrical power.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
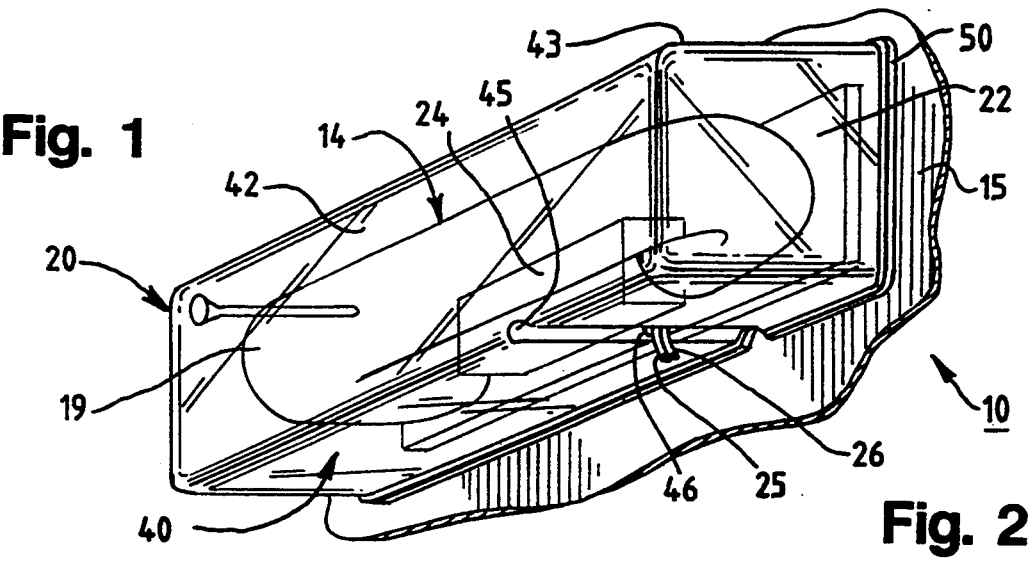
FIG. 1 is a pictorial view of a neon illumination apparatus which is constructed in accordance with the present invention.

Referring now to the drawings, and more particularly to FIG. 1 thereof, there is shown an illumination apparatus 10 which is constructed in accordance with the present invention. In accordance with the method of the present invention, the illumination apparatus 10 can provide a given area to be illuminated with bright glowing light when energized with low voltage direct current power.

The illumination apparatus 10 generally comprises a neon tube 14, having a pair of reversely bent end portions indicated generally at 16 and 17 respectively for defining a small space 18 therebetween. The neon tube 14 is mounted in a tube holder 20 for holding the neon tube 14 in a stationary position relative to a mounting surface 15 adjacent to the area to be illuminated. The tube holder 20 is translucent so that light produced by the neon tube 14 can be radiated both axially and radially from the interior of holder 20.

A power device indicated generally at 21 is fixed to the tube holder 20, and is more fully described in co-pending U.S. patent application Ser. No. 08/005,643. The power device 21 includes a pair of conductors 25 and 26 respectively, which are adapted to be connected electrically to a power distribution system (not shown), such as the power distribution system of an automobile. This arrangement enables one or more power devices, such as the power device 21, to be connected in series with a source of direct current low voltage power, such as 12 V direct current power.

The power device 21 includes a power conversion unit 22 to supply high frequency power and a high frequency step up transformer 24 in order to energize the neon tube 14 with high voltage power. The high frequency transformer 24, which is relatively small in size, is disposed within the space 18, and is coupled electrically between the neon tube 14 and the power conversion unit 22. The power conversion unit 22 and the transformer 24, are mounted behind the neon tube 14 within the tube holder 20 and spaced apart from the front of tube holder 20. This arrangement between the electronics and neon tube construction provides a substantially unobstructed end-to-end lighting arrangement. Thus, as will be explained hereinafter in greater detail, when the illumination apparatus 10 is connected in series with one or more like illumination apparatus (not shown), both large and small areas can be illuminated with end-to-end neon lighting.

In use, the illumination apparatus 10 is mounted to a mounting surface, such as the mounting surface 15. If required, one or more like illumination apparatus (not shown) are connected in series electrically to the illumination apparatus 10 so that the given area to be illuminated is disposed adjacent to the mounted illumination apparatus. Next, the conductors of the illumination apparatus 10 is connected electrically to the source of direct current power, such as the electrical system of a motor vehicle. In this manner, when electrical energy is supplied by the power source to the neon apparatus, the area to be illuminated is radiated with bright glowing light via the neon tube 14 within the apparatus 10.

While the power unit 21 has been described as converting direct current power to high frequency alternating current power, it will be understood by those skilled in the art that such a power unit may also convert low frequency alternating current power to high frequency alternating current power.

The method of constructing the illumination apparatus 10 generally comprises mounting the neon tube 14 within the translucent tube holder 20. Positioning the power conversion unit 22 behind the neon tube 14, with the transformer 24 disposed within the space 18. Sealing the neon tube 14 and the power conversion unit 22 within the tube holder 20.

In this manner, when the neon tube 14 is energized with high voltage power, via the transformer 24, the light radiating from the neon tube will be substantially unobstructed axially to provide a source of end to end lighting. In addition, light can be radiated radially unobstructedly in substantially all directions, except toward the mounting surface area occupied by the illumination apparatus 10, to illuminate fully the surrounding area.

Considering now the construction of the illumination apparatus 10 in greater detail, the neon tube 14 has a pair of electrodes 30 and 32 that are disposed on the distal ends of the end portions 16 and 17 respectively. The electrodes 30 and 32 are adapted to be connected to the transformer 24 in order to enable the neon tube 14 to be energized with high voltage high frequency electrical power.

As best seen in FIG. 1, the end portions 16 and 17 are integrally connected to a central body portion indicated generally at 19 and are reversely bent therefrom in opposite directions extending axially towards one another and behind the body portion 19. The respective end portions 16 and 17 are U-shaped and slightly smaller in their overall diameter than the body portion 19. The electrodes 30 and 32 are disposed substantially within the respective end portions 16 and 17 except for their respective distal ends. The electrodes 30 and 32 include body members 34 and 36 respectively. The body members 34 and 36 are disposed within the interior of the tube 14. That area of the neon tube 14 occupied by the body members 34 and 36 is not illuminated when the tube 14 is energized. However, with the body portion 19 of the neon tube 14 being disposed adjacent to a face portion 42 of the tube holder 20 and with the end portions 16 and 17 being disposed substantially behind the body portion 19 and spaced apart from the face 42, the entire face 42 from end-to-end passes the bright glowing light radiated by the tube 14. Also, as will be explained hereinafter in greater detail, as the ends of the tube holder 20 are also translucent, the light radiating axially from the tube 14, also passes through the ends of the holder 20.

As best seen in FIG. 1, the end portions 16 and 17 are sufficiently spaced apart from one another to permit the transformer 24 to be disposed therebetween in the space 18. Also, the U shape of the respective end portions 16 and 17 form another space 18A between the body 19 and that portion of the respective end portions 16 and 17 disposed spaced apart from the body portion 19. Space 18A has a sufficient volume area to receive the transformer 24 therewithin.

Figure 2:
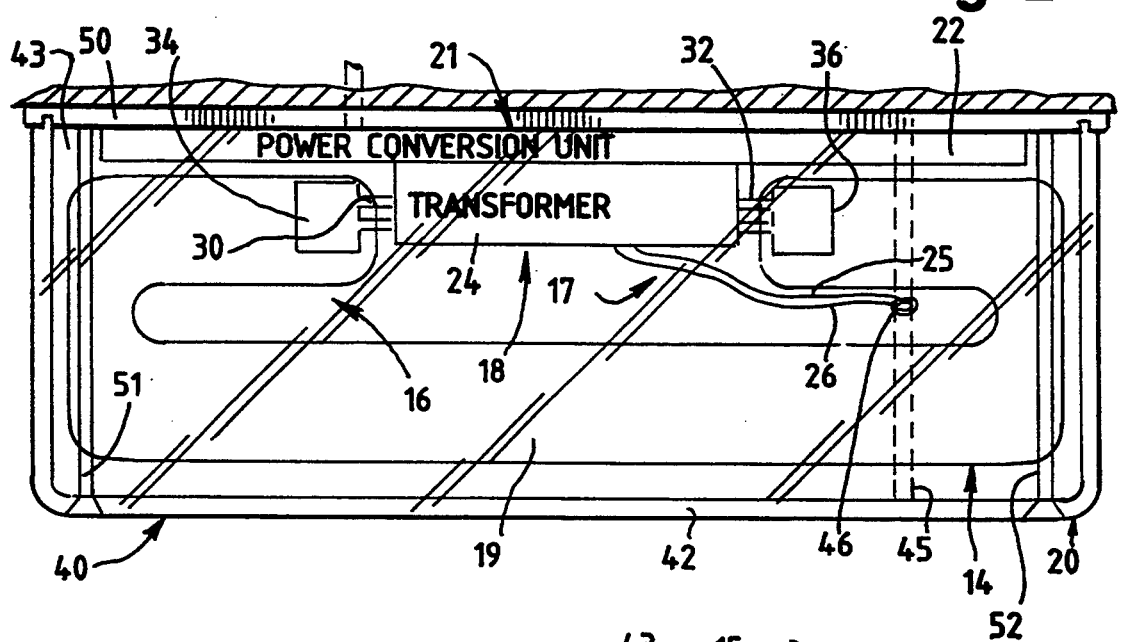
FIG. 2 is an enlarged top elevational view of the neon illumination apparatus of FIG. 1.

Considering now the tube holder 20 in greater detail with reference to FIG. 2, the tube holder 20 generally includes an elongated body member 40 for defining a generally C-shaped channel 41. The channel 41 has a sufficient volume and diameter to receive the tube 14 therewithin. The tube 14 is mounted within the channel 41 by means not shown, such as by clips or C-ring grommets. The body member 40 is an extruded part having a unitary construction. The body member 40 is composed of a translucent material, such as a translucent plastic material. In this regard, light radiating radially from the neon tube 14 passes substantially unobstructedly through the body member 40.

Figure 3:
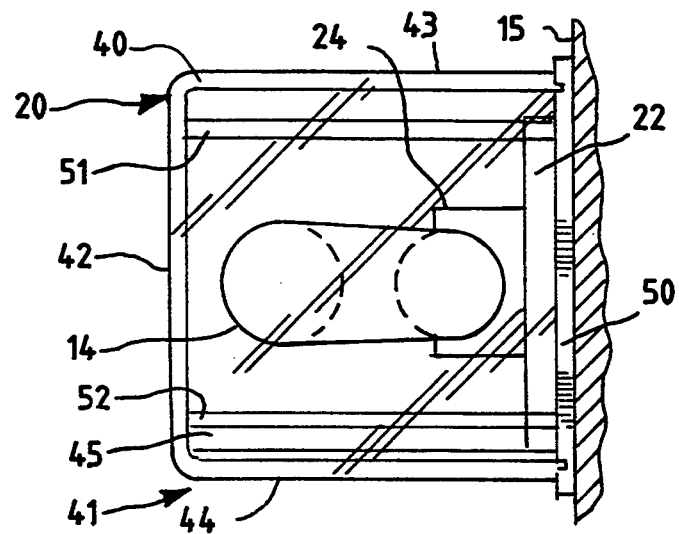
FIG. 3 is an enlarged end elevational view of the neon illumination apparatus of FIG. 1.

The body member includes the face 42, a top portion 43 and a bottom portion 44. As best seen in FIGS. 1 and 3, the bottom portion 44 includes an elongated groove 45 that extends across its entire transverse dimension. An oval shaped hole or aperture 46 is disposed in the center of the groove 45 and is dimensioned for allowing the conductors 25 and 26 to pass therethrough. The conductors 25 and 26 may be routed in the groove 45.

From the foregoing, it will be understood by those skilled in the art that the apparatus 10 may be mounted either with the face 42 being spaced from the mounting surface 15 or with the plate 50 being spaced from the mounting surface 15. This alternate mounting arrangement is provided to help diffuse the bright glowing light emitted from the holder 40 when required. In this regard, either the clear translucent face 42 or the opaque plate 50 can face outwardly toward a viewer.

An elongated base plate 50 is dimensioned to be secured to the rear of the body member 40. In this regard, the plate 50 seals the neon tube 14 and transformer 24 within the holder 24 when engaged with the body member 40. The base plate 50 is a molded part and is composed of an opaque material, such as an opaque plastic material.

In order to enable the plate 50 and holder 40 to be secured to a mounting surface, such as the surface 15, a pair of countersunk apertures 51 and 52 extend through the holder 40 and plate 50. The apertures 51 and 52 are dimensioned for receiving a pair of mounting screws (not shown).

Figure 4:
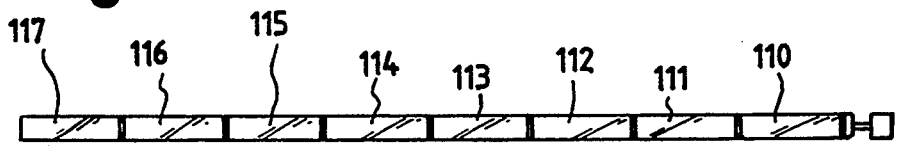
FIG. 4 is a front elevational view of a neon illumination apparatus, which is constructed in accordance to the present invention and which is shown illustratively connected in series with a plurality of like apparatus and a source of direct current power.

Referring now to the drawings, and more particularly to FIG. 4 thereof, there is shown an illumination apparatus 110 which is constructed in accordance with the present invention. The illumination apparatus 110 is illustrated connected in series between a plurality of like illumination apparatus 111–117 and a source of direct current power 118, such as a battery or power supply. The illumination apparatus 110 is substantially similar to apparatus 10 except as will be described hereinafter in greater detail.

In accordance with the method of the present invention, the illumination apparatus 110 can be connected in series with the source of direct current power and as many like units, such as units 111–117 to illuminate any given area with bright glowing light. For example, a walkway, a ceiling area of a home, or the interior of an automobile.

The illumination apparatus 110 generally comprises a neon tube 114, a power or energy conversion unit 122 and a high frequency transformer 124 which are substantially similar to the neon tube 14, the power conversion unit 22 and the high frequency transformer 24, respectively. The neon tube 114, power conversion unit 122 and high frequency transformer are mounted in a tube holder 120 which is adapted to be coupled mechanically and electrically to a like neon illumination apparatus unit, such as the apparatus 111 and the source of direct current power 118.

Figure 5:
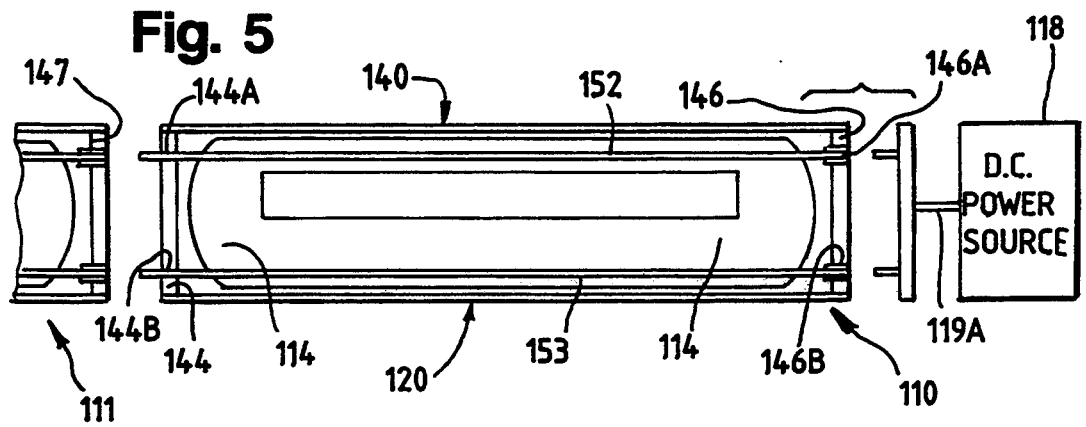
FIG. 5 is a greatly enlarged front elevational view of the neon apparatus of FIG. 4 and which illustrates a set of connectors for coupling the apparatus in series with the like apparatus and the source direct current power of FIG. 4.
Figure 6:
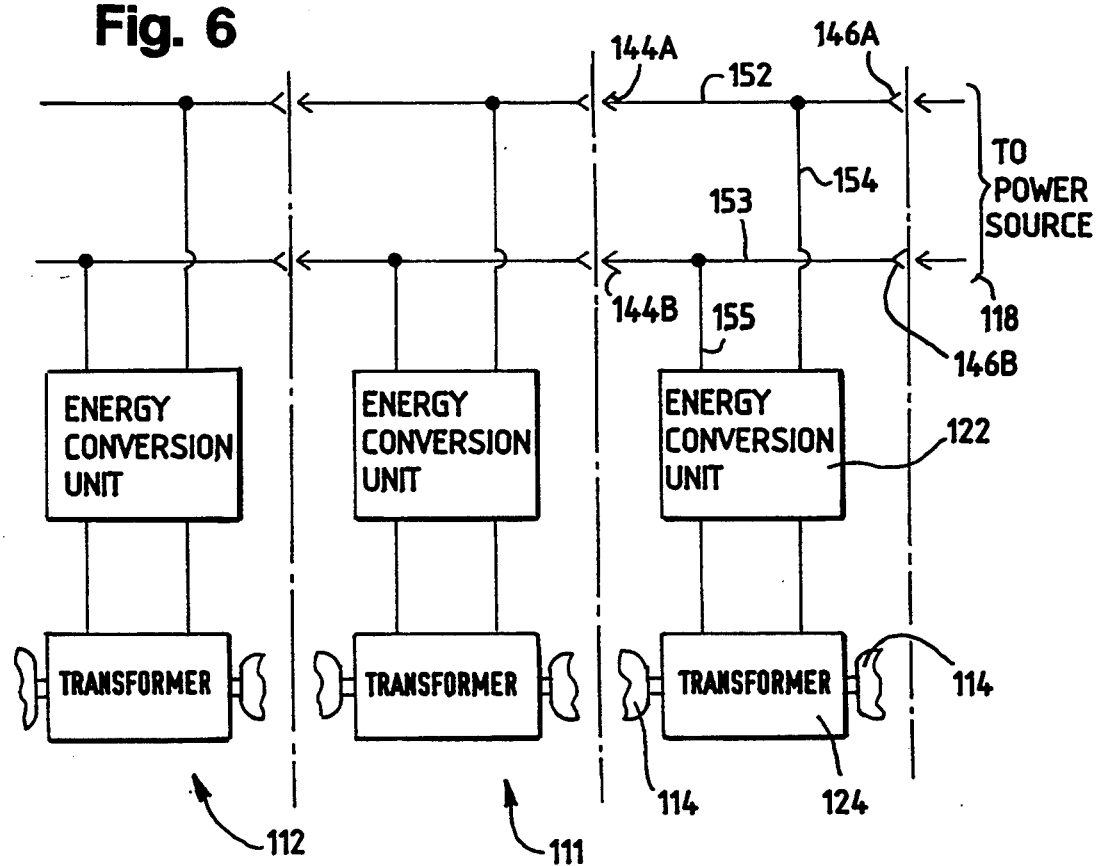
FIG. 6 is a schematic diagram illustrating the series connections between the illumination apparatus of FIG. 4.
Figure 7:
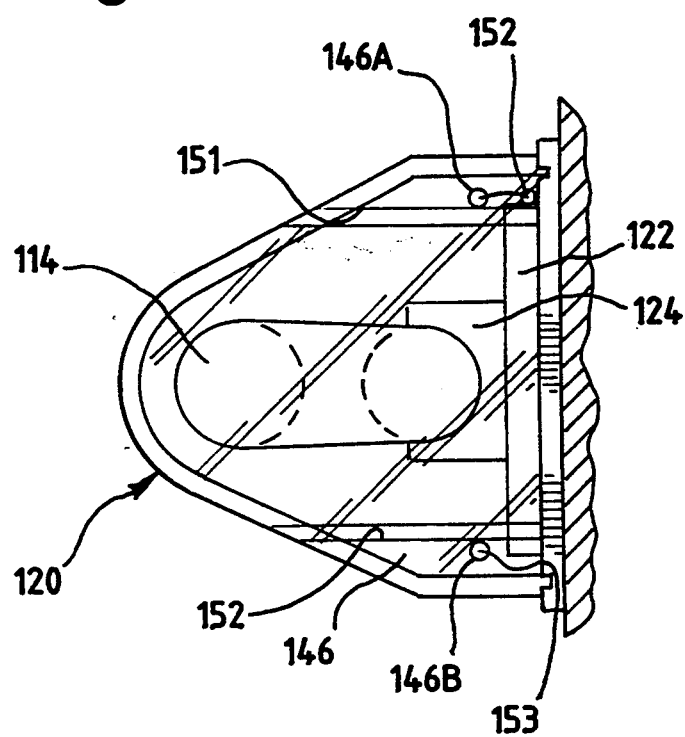
FIG. 7 is an end elevational view of the neon apparatus of FIG. 4.

Considering now the tube holder 120 in greater detail with reference to FIGS. 4–6, the tube holder 120 generally includes an elongated body member 140 for defining a D-shaped channel. The channel has a sufficient volume and diameter to receive the tube 114 therewithin. The tube 114 is mounted within the channel by means (not shown), such as by clips or C-ring grommets. The body member 140 is an extruded plastic part having a unitary construction and is composed of a translucent material, such as a translucent plastic material. In order to enable the tube holder 120 to be mounted to a stationary surface, such as a stationary surface 115, a pair of mounting holes 151 and 152 are provided in the body member 140. Holes 151 and 152 are each adapted to receive a mounting screw (not shown).

The tube holder 120 also includes a pair of end caps, a male end cap 144 and a female end cap 146. The female cap 146 is adapted to receive in mating electrical and mechanical engagement a power plug 119 connected electrically to the power supply 118 by an electrical conductor cable 119A. The male cap 144 is adapted to engage another female cap 147 with a like illumination apparatus such as a female cap 147 in like apparatus 111. The female cap 147 is substantially similar to female cap 146.

The end caps 144 and 146 are molded parts and are composed of a translucent material, such as a translucent plastic material. In this regard, light radiating axially from the neon tube 114 passes substantially unobstructedly through the end caps 144, 146 and 147. Thus, a person viewing two or more of the illumination apparatus connected in series, such as the apparatus 110 and 111, perceives the connected apparatus as a single unit with full end-to-end lighting.

The body member 140 and the end cap members 144 and 146 are secured together by any conventional technique, such as by gluing.

As best seen in FIG. 5, the end caps 144 and 146 each include a set of electrical contacts, such as a set of contacts 144A and 144B associated with end cap 144 and a set of contacts 146A and 146B associated with end cap 146.

A pair of transparent electrical conductor 152 and 153 are disposed within the interior of the holder to provide an electrical path that extends the entire longitudinal length of the holder 120. The electrical conductors 152 and 153 are connected electrically to the electrical contacts 144A, 146A and 144B and 146B, respectively. In this regard, the electrical contacts in combination with the electrical conductors 152 and 153 provide a path for the low voltage direct current power.

Another pair of conductors 154 and 155 connect the conductors 152 and 153 to the power conversion unit 122. Thus, when direct current power flows along the conductors 152 and 153, the power conversion unit 122 is energized.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An illumination apparatus for mounting on a stationary surface, comprising:
   elongated tube holder means being adapted to be mounted on the stationary surface and being hollow throughout its length and defining an internal space;
   said tube holder means having a translucent front wall member extending substantially complete axial length of said tube holder means for enabling bright glowing light to pass outwardly therethrough to provide illumination substantially completely unobstructedly from end-to-end thereof;
   said tube holder means having a back wall member extending substantially the complete axial length of said tube holder means, and a pair of spaced apart end wall members extending between said front wall member and said back wall member, said back wall member being adapted to be mounted on the stationary surface;
   elongated tube illuminating means disposed within said tube holder means for radiating bright glowing light in all directions, said tube means being dimensioned to occupy substantially the entire internal Space of said tube holder means;
   said tube means having an elongated central body portion for radiating bright glowing light radially outwardly over its entire axial length to illuminate substantially the entire axial length of said front wall member;
   said tube means further having pair of spaced apart U-shaped reversely bent end portions integrally connected at opposite ends of said central body portion and extending axially toward in close proximity to and adjacent to respective ones of said end wall members and thence, extending axially away from the respective ones of said end wall members and towards one another behind said central body portion for radiating bright glowing light radially outwardly over substantially their entire axial length to illuminate substantially completely unobstructedly the peripheral end portions of said front wall member for end-to-end lighting purpose;
   said end portions each having an integrally connected non-illuminating distal end member adapted to be energized electrically for causing said tube means to illuminate bright lowing light;
   each non-illuminating distal end member being disposed sufficiently behind said central body portion to be concealed from view through said front wall member so that said front wall member is illuminated along its entire axial length unobstructedly by said tube means;
   power means being thin and flat in configuration and being mounted flat against said back wall member within said tube holder means for generating low voltage, high frequency electrical energy;
   transformer means mounted on said power means projecting forwardly therefrom and coupled electrically between said non-illuminating distal end members and said power means for generating high voltage high frequency energy of a sufficient value to fully energize said tube means;
   means defining a power means receiving space between said back wall member and a rear portion of the non-illuminating distal end members for receiving therein said power means;
   means defining a transformer means receiving space between the non-illuminating distal end members and said power means behind said central body portion of said tube means for receiving therein said transformer means to conceal it from view through said front wall member, said transformer means being dimensioned to fit entirely within said transformer means receiving space behind the central tube body portion to permit said front wall member to be illuminated unobstructedly along its entire axial length; and
   means for mounting said tube holder means to the stationary surface;
   whereby bright flowing light radiates from within said tube holder means outwardly through the translucent front wall member to provide a source of unobstructed end-to-end lighting.

2. An illumination apparatus according to claim 1, wherein said tube holder means further includes a translucent connector coupled electrically to said power means and disposed adjacent to one of the reversely bent end portions and another translucent connector coupled electrically to the first mentioned connector and disposed adjacent to the other one of the reversely bent end portions for enabling a like illumination apparatus to be coupled electrically to said power means and mechanically to the first mentioned illumination apparatus.

3. An illumination apparatus according to claim 1, wherein said front wall member and said pair of end wall members are configured together to give said tube holder means a generally C-shaped configuration.

4. An illumination apparatus according to claim 1, wherein said front wall member and said pair of end wall members are configured together to give said tube holder means a generally D-shaped configuration.

5. An illumination apparatus according to claim 1, wherein said tube holder means includes low voltage connector means for helping to couple said power means to a source of low voltage power.

6. An illumination apparatus according to claim 5, wherein said connector means includes a male end cap and a female end cap, said male and female end caps being secured at opposite ends of said tube holder means.

7. An illumination apparatus according to claim 6, wherein one of the male and female end caps includes electrical coupling means for connection to said source of low voltage power.

8. An illumination apparatus according to claim 7, wherein another one of the male and female end caps includes end cap coupling means for electrical connection to another illumination apparatus;
   whereby at least two of the illumination apparatus are connected end-to-end.

9. An illumination apparatus according to claim 6, further includes means for mounting said power means at least partially within said tube holder means whereby bright light radiating radially from that portion of said tube illuminating means adjacent to said power means is substantially blocked and wherein said mounting means includes:

screw means for attachment to said stationary surface;

means defining a countersunk aperture disposed within said tube holder means for receiving said screw means; and whereby said tube holder means is secured removably on said screw means and said screw means is adapted to be secured removably to said stationary surface.

10. An illumination apparatus according to claim 9, wherein the stationary surface is defined by a surface on a motor vehicle.

11. An illumination apparatus according to claim 9, wherein the stationary surface is defined by a surface on a building structure.

12. An illumination apparatus according to claim 6, wherein said male and female end caps are substantially transparent.

13. An illumination apparatus according to claim 6, wherein said male and female end caps are substantially translucent.

14. An illumination apparatus according to claim 6, wherein said male and female end caps are opaque.

15. An illumination apparatus according to claim 1, wherein each of the end wall members is transparent.

16. An illumination apparatus according to claim 1, wherein each of the end wall members is translucent.

17. An illumination apparatus according to claim 1, wherein each of the end wall members is opaque.

18. An illuminating apparatus according to claim 1, wherein said power means includes direct current energy conversion means spaced axially apart from said tube illuminating means.

19. An illumination apparatus according to claim 1, wherein said back wall member includes:

conductor means for conducting electrical energy axially along substantially the entire longitudinal length thereof; and wherein the illumination apparatus further comprises:

a pair of transparent spaced apart electrical connector means to facilitate the end-to-end lighting purposes, one of said electrical connector means adapted to be coupled electrically to said power means and the other one of said electrical connector means adapted to be coupled electrically to another illumination apparatus for supplying it with direct current power; and said tube holder means for sealing said tube illuminating means therewithin for helping to insulate electrically said tube illuminating means from external ground potential short circuits.

* * * * *

UNITED STATES PATENT AND TRADEMARK OFFICE
CERTIFICATE OF CORRECTION

PATENT NO. : 5,436,813
DATED : July 25, 1995
INVENTOR(S) : Jaime D. Gonzalez

It is certified that error appears in the above-indentified patent and that said Letters Patent is hereby corrected as shown below:

Title page,
Item [73], delete "Assignee:  U.S. Neon Corporation, Huntington Park, Calif."

Signed and Sealed this

Seventh Day of May, 1996

Attest:

BRUCE LEHMAN

*Attesting Officer*    *Commissioner of Patents and Trademarks*